UNITED STATES PATENT OFFICE.

HENRI RAYMOND VIDAL, OF PARIS, FRANCE.

RED DYE AND PROCESS OF MAKING SAME.

SPECIFICATION forming part of Letters Patent No. 609,598, dated August 23, 1898.

Application filed July 24, 1897. Serial No. 645,858. (Specimens.) Patented in France, February 27, 1897, No. 264,512, and in England March 3, 1897, No. 5,689.

*To all whom it may concern:*

Be it known that I, HENRI RAYMOND VIDAL, of Paris, France, have invented new and useful Improvements in Coloring-Matters, (for which I have obtained patents in France, No. 264,512, dated February 27, 1897, and in England, No. 5,689, dated March 3, 1897,) which are clearly described in the following specification.

This invention relates to the preparation of new coloring-matters derived from carboxylated compounds of the amido or hydroxylated triphenylcarbinols.

The improved coloring-matters are of great vividness and act directly upon animal fibers and dye mordanted cotton.

I obtain these coloring-matters by causing hydrazin and the mono-substituted hydrazins to act upon the products mono, di, or tri carboxylates of triphenyloxycarbinol, the carboxylated positions of which are situated in meta or ortho with regard to the amido or oxy groups. I take, for example, phenylhydrazin, five kilos; trioxyphenylcarbinol dicarboxylated, ortho or meta, five kilos five hundred grams. I heat to 100° centigrade for twelve hours in an enameled cast-iron caldron provided with an agitator. The operation is terminated when the slight ebullition which is produced during the reaction has ceased and the mass becomes of a red blue, very vivid and very pure. The product is exhausted with dilute hydrochloric acid and precipitated by an alkali. It is then thrown upon a filter and dried.

Having now particularly described and ascertained the nature of my said invention and in what manner the same is to be performed, I declare that what I claim is—

1. The method of producing coloring-matters by heating hydrazins with a carboxylated carbinol compound, such as dicarboxylated trioxyphenylcarbinol, substantially as described.

2. The described coloring-matters derived from carboxylated carbinol compounds (such as dicarboxylated trioxyphenylcarbinol) the same being a vivid red-blue mass, soluble in alkalies, capable of dyeing directly animal and mordanted cotton fibers, substantially as described.

In testimony whereof I have signed this specification in the presence of two subscribing witnesses.

HENRI RAYMOND VIDAL.

Witnesses:
    EDWARD P. MACLEAN,
    ANTOINE RONNAMUS.